(12) United States Patent
Lange et al.

(10) Patent No.: US 12,225,154 B1
(45) Date of Patent: *Feb. 11, 2025

(54) ENHANCED CALLER INFORMATION

(71) Applicant: FIRST ORION CORP., North Little Rock, AR (US)

(72) Inventors: Joshua Harrison Lange, Seattle, WA (US); Mark Himelfarb, Little Rock, AR (US); Scott Hambuchen, Little Rock, AR (US); Matthew Beckham, Conway, AR (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,947

(22) Filed: Jul. 31, 2023

Related U.S. Application Data

(63) Continuation of application No. 18/176,428, filed on Feb. 28, 2023, now Pat. No. 11,800,008, which is a continuation of application No. 16/870,985, filed on May 10, 2020, now Pat. No. 11,595,516, which is a continuation of application No. 15/223,546, filed on Jul. 29, 2016, now abandoned.

(60) Provisional application No. 62/199,124, filed on Jul. 30, 2015.

(51) Int. Cl.
  *H04M 3/42* (2006.01)
  *H04M 1/57* (2006.01)
  *G06Q 30/0241* (2023.01)

(52) U.S. Cl.
  CPC ......... *H04M 3/42042* (2013.01); *H04M 1/57* (2013.01); *G06Q 30/0241* (2013.01)

(58) Field of Classification Search
  CPC ........ H04L 29/08108; H04M 3/42025; H04M 3/42034; H04M 3/42042; H04M 4/42051; H04M 3/42059; H04M 3/42068; H04M 3/42076; H04M 3/42085; H04M 3/42093; H04M 3/42102; H04M 3/4211; H04M 3/42119; H04W 4/12; H04W 4/14
  See application file for complete search history.

(56) References Cited

U.S. PATENT DOCUMENTS

| | | |
|---|---|---|
| 6,668,049 B1 | 12/2003 | Koch et al. |
| 8,295,819 B1 | 10/2012 | Kaplan et al. |
| 8,880,035 B1 | 11/2014 | Beck et al. |
| 9,203,954 B1 | 12/2015 | Rensburg et al. |
| 2002/0160745 A1 | 10/2002 | Wang |
| 2005/0195950 A1 | 9/2005 | Lee et al. |
| 2006/0120377 A1 | 6/2006 | Caballero-Mccann et al. |
| 2008/0010287 A1 | 1/2008 | Hinton et al. |
| 2009/0086950 A1 | 4/2009 | Vendrow et al. |
| 2009/0203369 A1 | 8/2009 | Opore et al. |
| 2010/0171805 A1 | 7/2010 | Ron et al. |
| 2010/0309282 A1 | 12/2010 | Hsieh |

(Continued)

*Primary Examiner* — Matthew W Genack

(57) ABSTRACT

Various media or other related information may be provided during a call between a calling device and a called device. One example method of operation may include initiating a call via an origination device to a recipient device, transmitting a call notification to an enhanced information server responsive to initiating the call, retrieving enhanced information associated with the intended recipient device and/or the origination device, transmitting the enhanced information to the intended recipient device and/or the origination device, and connecting the call between the origination device and the intended recipient device.

20 Claims, 14 Drawing Sheets

(56) References Cited

U.S. PATENT DOCUMENTS

2010/0310063 A1  12/2010  Moon et al.
2013/0051542 A1   2/2013  Yao et al.
2015/0172419 A1   6/2015  Toledo et al.
2016/0150089 A1   5/2016  Garg

300

310

400

410

900

ENHANCED CALLER INFORMATION

TECHNICAL FIELD OF THE APPLICATION

This application relates to pairing caller identification information and related contextual information with a particular caller and more particularly to loading media data associated with a particular caller.

BACKGROUND OF THE APPLICATION

Conventionally, a caller and a call recipient may share certain profile information during a call session. For example, the call recipient may observe a photograph or other illustrative identifier associated with a calling party as it appears on the call recipient device (e.g., smartphone). The locally image or other call recipient may have a stored information (i.e., social networking information, caller ID information including name, state, town, etc.) appear on the call recipient device.

In almost all instances of pairing information with a particular calling entity, the information is either minimal, such as a caller identification name and/or location or the caller identification information is paired with information that is locally stored on the recipient device (i.e., profile information). The information related to the caller, the purpose of the call, the information likely to be shared during the call and any images and/or videos or other media which are relevant to the call are seldom identified or shared at the onset of the call. Instead, the smartphone devices so commonly used to answer calls are not utilizing their full potential both before and during a call session.

SUMMARY OF THE APPLICATION

One example embodiment of the present application may provide a method, system, component, device and/or non-transitory computer readable medium that provides information before and/or during a call. In another example embodiment, the information can be provided after the call.

According to one example embodiment, a method of operation may include at least one of identifying a call has been initiated via an origination device to a recipient device, responsive to identifying the call, retrieving at least one user profile associated with the origination device and the recipient device, identifying at least one enhanced information tag in the at least one user profile, retrieving enhanced information linked to the at least one enhanced information tag, the enhanced information associated with at least one of the intended recipient device and the origination device, transmitting the enhanced information to at least one of the intended recipient device and the origination device, and connecting the call between the origination device and the intended recipient device.

According to yet another example embodiment, an apparatus includes a processor configured to identify a call has been initiated via an origination device to a recipient device, responsive to identifying the call, retrieving at least one user profile associated with the origination device and the recipient device, identifying at least one enhanced information tag in the at least one user profile, retrieving enhanced information linked to the at least one enhanced information tag, the enhanced information associated with at least one of the intended recipient device and the origination device, and a transmitter configured to transmit the enhanced information to at least one of the intended recipient device and the origination device, and connect the call between the origination device and the intended recipient device.

According to still another example embodiment, a non-transitory computer readable storage medium configured to store instructions that when executed causes a processor to perform certain operations. For instance, the processor is configured to perform at least one identifying a call has been initiated via an origination device to a recipient device, responsive to identifying the call, retrieving at least one user profile associated with the origination device and the recipient device, identifying at least one enhanced information tag in the at least one user profile, retrieving enhanced information linked to the at least one enhanced information tag, the enhanced information associated with at least one of the intended recipient device and the origination device, transmitting the enhanced information to at least one of the intended recipient device and the origination device, and connecting the call between the origination device and the intended recipient device.

Still yet another example embodiment may include a method that includes at least one of initiating an application via a device, transmitting a communication session request to an intended recipient device via the application, intercepting the communication session request via a third server, party retrieving enhanced information associated with the intended recipient, and connecting a live session between the device and the intended recipient device.

Still yet a further example embodiment includes an apparatus that includes a processor configured to initiate an application via a device and a transmitter configured to transmit a communication session request to an intended recipient device via the application, and wherein the processor is further configured to perform at least one of intercept the communication session request via a third party server, retrieve enhanced information associated with the intended recipient, and connect a live session between the device and the intended recipient device.

Yet still another example embodiment may include a non-transitory computer readable storage medium configured to store instructions that when executed causes a processor to perform at least one of initiating an application via a device, transmitting a communication session request to an intended recipient device via the application, intercepting the communication session request via a third party server, retrieving enhanced information associated with the intended recipient, and connecting a live session between the device and the intended recipient device.

Still yet a further example embodiment may include a method that provides at least one of initiating a call via an origination device to a recipient device, transmitting a call notification to an enhanced information server responsive to initiating the call, retrieving enhanced information associated with at least one of the intended recipient device and the origination device, transmitting the enhanced information to at least one of the intended recipient device and the origination device, and connecting the call between the origination device and the intended recipient device.

Still yet another example embodiment may include an apparatus that includes a processor configured to initiate a call via an origination device to a recipient device, and a transmitter configured to transmit a call notification to an enhanced information server responsive to the call being initiated, and the processor is further configured to retrieve enhanced information associated with at least one of the intended recipient device and the origination device, and the transmitter is further configured to transmit the enhanced information to at least one of the intended recipient device and the origination device, and connect the call between the origination device and the intended recipient device.

Still yet a further embodiment may include a non-transitory computer readable storage medium configured to store instructions that when executed causes a processor to perform at least one of initiating a call via an origination device to a recipient device, transmitting a call notification to an enhanced information server responsive to initiating the call, retrieving enhanced information associated with at least one of the intended recipient device and the origination device, transmitting the enhanced information to at least one of the intended recipient device and the origination device, and connecting the call between the origination device and the intended recipient device.

DETAILED DESCRIPTION OF THE APPLICATION

Figure 1:
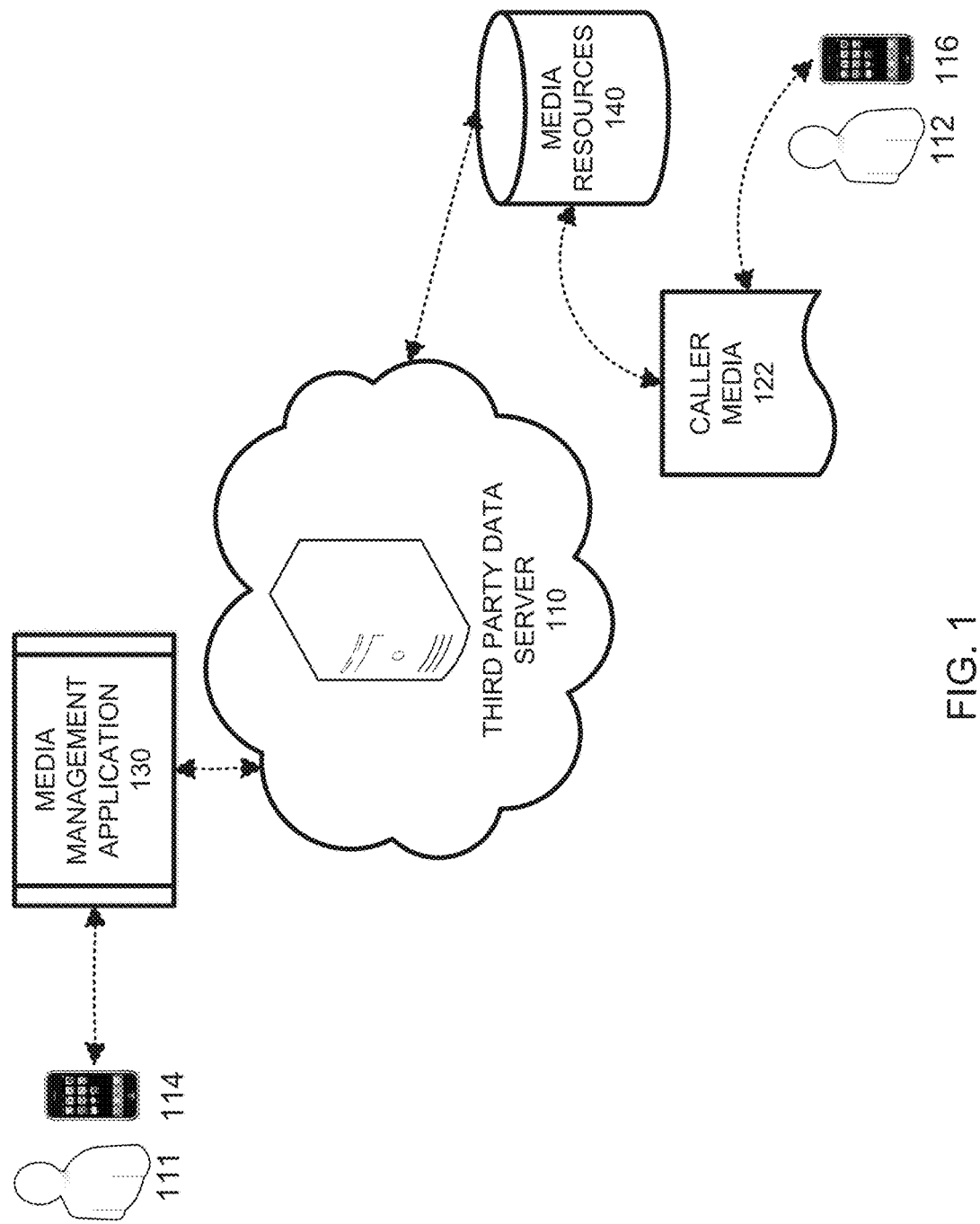
FIG. 1 illustrates an example network configuration 100 according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide enhanced caller information being shared with a callee or called device either before, during, contemporaneously and/or after a call session is established. The types of enhanced information may include audio, text, images, video, web links, application functions, promotions, brochures, etc. The called device may communicate with a third party application, hardware device, remote server, database, etc., to retrieve the enhanced information prior to or during a call session. An incoming/outgoing communication event reference may be referred to as an instance where the enhanced caller information is retrieved based on a particular event or trigger. Also, such information may be stored in an incoming/outgoing communication event reference database for retrieval and reference purposes. The event reference database may be an internal storage location on a user device. The information may be retrieved response to a call or call related event. The information can be retrieved and displayed via an IP multimedia subsystem and/or rich communication services (IMS/RCS) or via a caller ID name configuration (CNAM) display or other known data reference and display methods. Also, an "incoming/outgoing communication event reference" may be used to refer to a manifestation of user profile information.

Similarly, the term "incoming/outgoing communication event reference database" can be used to refer to an on-device storage for such information to be used for display of user profiles. For example, a contact creation and display operation, IMS/RCS message display, CNAM display or other operations available on the device and specific to the device operating system (OS).

FIG. 1 illustrates an example network configuration 100 according to example embodiments. Referring to FIG. 1, the network includes two basic parties including a calling party or calling device 114 operated by an automated computer, a user 111, a group of users, etc. The calling device 114 may be a computer operated calling device, a phone, a smartphone or any other dialing device. The media application 130 may be a plug-in, phone application, browser enabled application or any other software based function that enables a calling device to initiate a call and to contact a third party server 110 to enable sharing of the enhanced information. The media resources 140 may include a user profile for a particular user, company, or other entity desiring to share media or enhanced information with the called device 116 and the called user 112.

Once the user profile of the calling device 114 is retrieved, the corresponding information entities associated with that user may be retrieved via tags or attribute identifiers as part of the retrieval request message. The tags can then be used to select the appropriate name images (user picture), marketing materials (advertisements, links, etc.) to associate with the current enhanced information retrieval and sharing operation. Then those images may be prepared as set of caller media 122 that can be sent to the user recipient device 116 of the recipient user 112. The caller media may be a file or set of files that can be displayed on the user recipient device 112 during the live call attempt. Other information provided as part of the enhanced caller information may include an audio file and/or video file, a social graph or social network information (i.e., significant events), a communication history of both parties participating in the call, a calendar of events associated with both parties, and/or certain presence or availability information of the caller.

Figure 2:
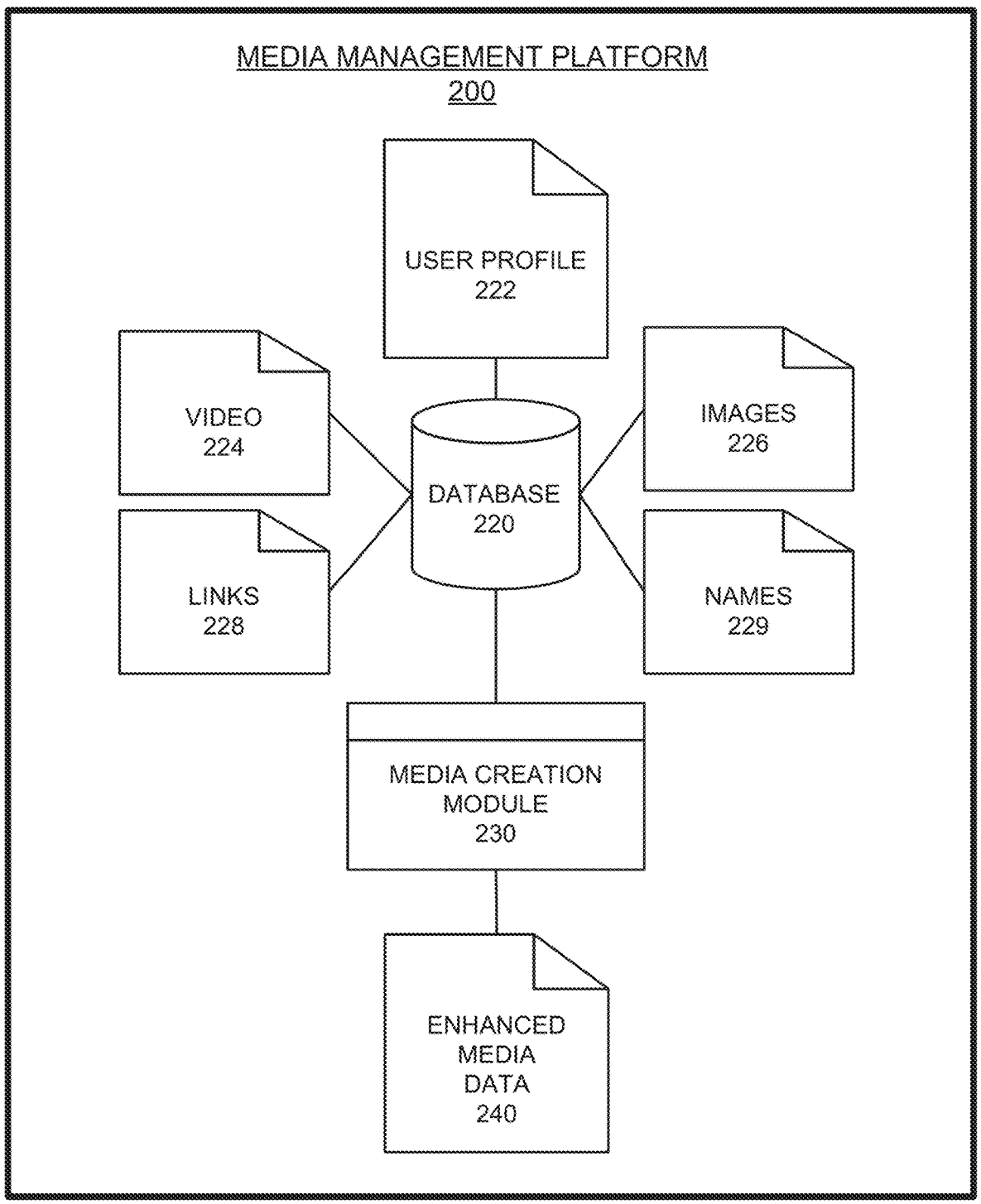
FIG. 2 illustrates a media management platform according to example embodiments.

FIG. 2 illustrates a media management platform according to example embodiments. Referring to FIG. 2, the media may be part of a logic scheme of a media management platform 200 that includes selecting the appropriate user profile 222 which includes customized and/or personalized video 224, links 228, images 226, names and other identifiers 229 which are stored in the database 220 of the third party server. The media creation module 230 may then create a message or messages with the intended caller media 122 so the end user recipient device can display the enhanced media data 240.

Figure 3:
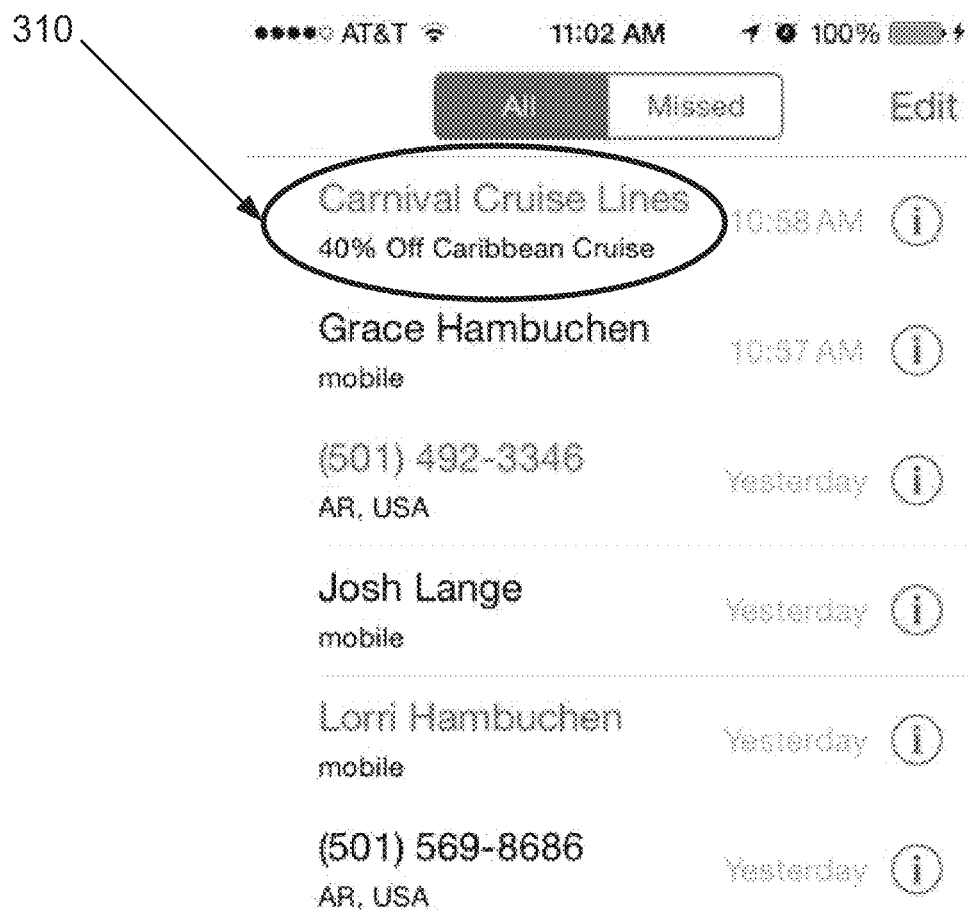
FIG. 3 illustrates a user interface of a smartphone call log with enhanced caller information according to example embodiments.

FIG. 3 illustrates a user interface of a smartphone call log with enhanced caller information according to example embodiments. Referring to FIG. 3, the media incorporated into the user display 300 may include a specific media and/or identifier suite of information. In this example, the user display 300 includes a specific set of enhanced information 310, such as a company name "CARNIVAL CRUISE LINES" an active coupon link "40% OFF CARNIVAL CRUISES" and other information which is intended to be marketed to the user of the user display device. Other information may include music, video, audio or any other media deemed necessary and identified by the tags of the retrieval message. The resulting media and enhanced information may be loaded and displayed on the recipient device for future action by the user.

Figure 4:
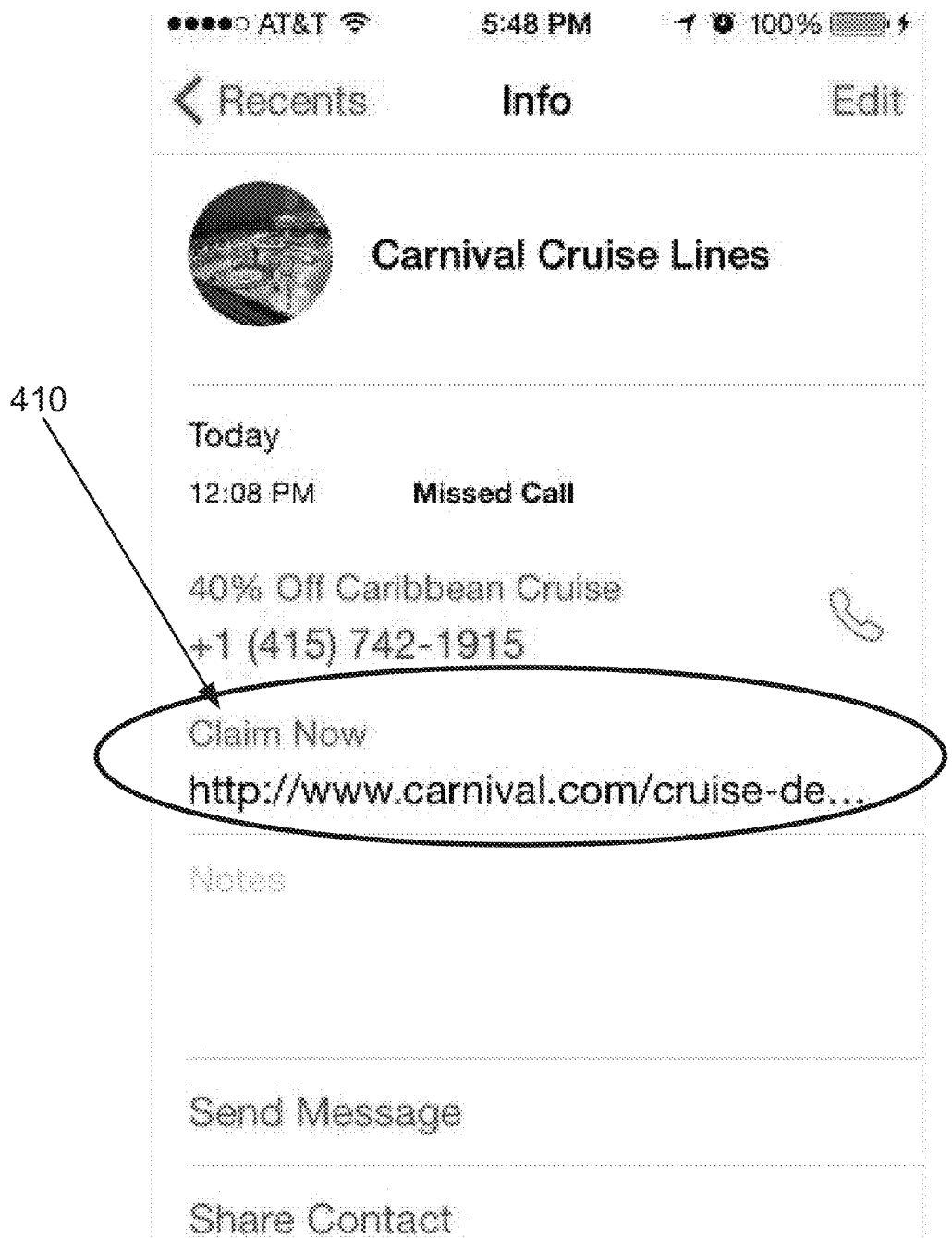
FIG. 4 illustrates a user interface of a smartphone call log with more detailed enhanced caller information according to example embodiments.

FIG. 4 illustrates a user interface of a smartphone call log with more detailed enhanced caller information according to example embodiments. Referring to FIG. 4, continuing with the same example, the user display 400 may include a link to a web address to retrieve the coupons or offers. The information may be presented along the missed call or recent call portion of a user device call log. This provides the user with an opportunity to ignore the unexpected call and still access the marketing materials presented as part of the missed or recent call log.

Figure 5:
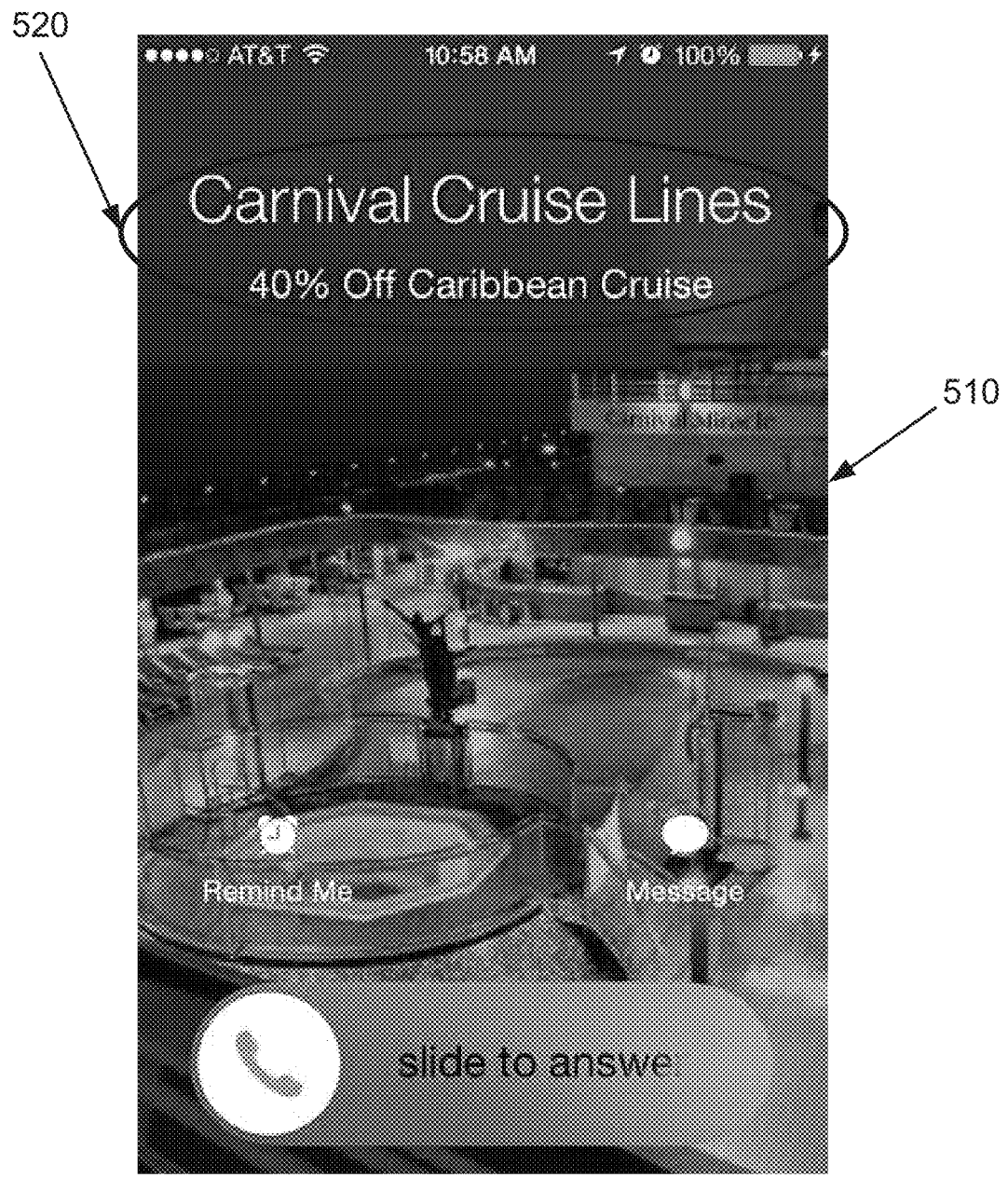
FIG. 5 illustrates a user interface of an advertisement displayed on a smartphone based on enhanced caller information according to example embodiments.

FIG. 5 illustrates a user interface of an advertisement displayed on a smartphone based on enhanced caller information according to example embodiments. Referring to FIG. 5, still continuing with the same marketing effort of FIGS. 2 and 3, the image data 510 may be paired with a headline marketing title 520, which is displayed on the user display 500. The user may access the link as part of the display which is presented as part of the active call or the missed call so a user can ignore an active call but still observe the intended purpose of the call as an incentive to access the information knowingly instead of the more conventional blind approach of answering a call with no indication of the call purpose.

According to an example embodiment, one example may include a calling party transmitting some sort of relevant information that will then travel across the carrier networks and show up on a user's device, which could be a picture or some other piece of information, voluntarily shared by the calling party. The caller will use some mechanism described above (e.g., mobile application, API or another process) to store that information inside a media server.

Figure 6:
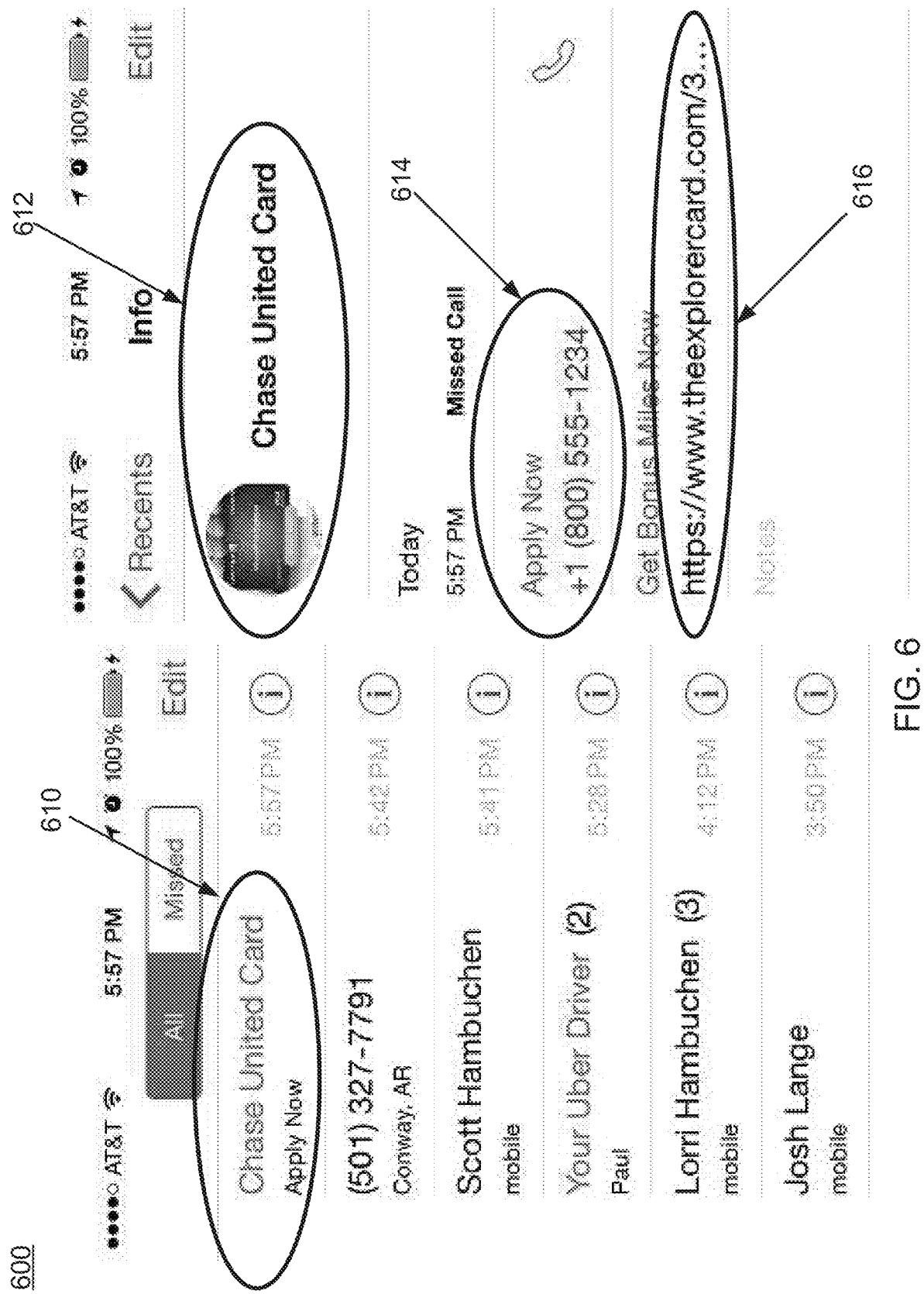
FIG. 6 illustrates another example of a user interface of a smartphone call log with detailed enhanced caller information according to example embodiments.

FIG. 6 illustrates another example of a user interface of a smartphone call log with detailed enhanced caller information according to example embodiments. Referring to FIG. 6, a set of user display interfaces 600 includes both a missed call log with a "CHASE" credit card advertisement 610. In the event that the user selects that particular call, logged more detailed information may appear as illustrated in the information display 612 with images, a call back number 614 and/or a web link 616, all of which enable a user to learn the purpose of the call and access the marketing promotion attributes at any time in the present or a future time.

Figure 7:
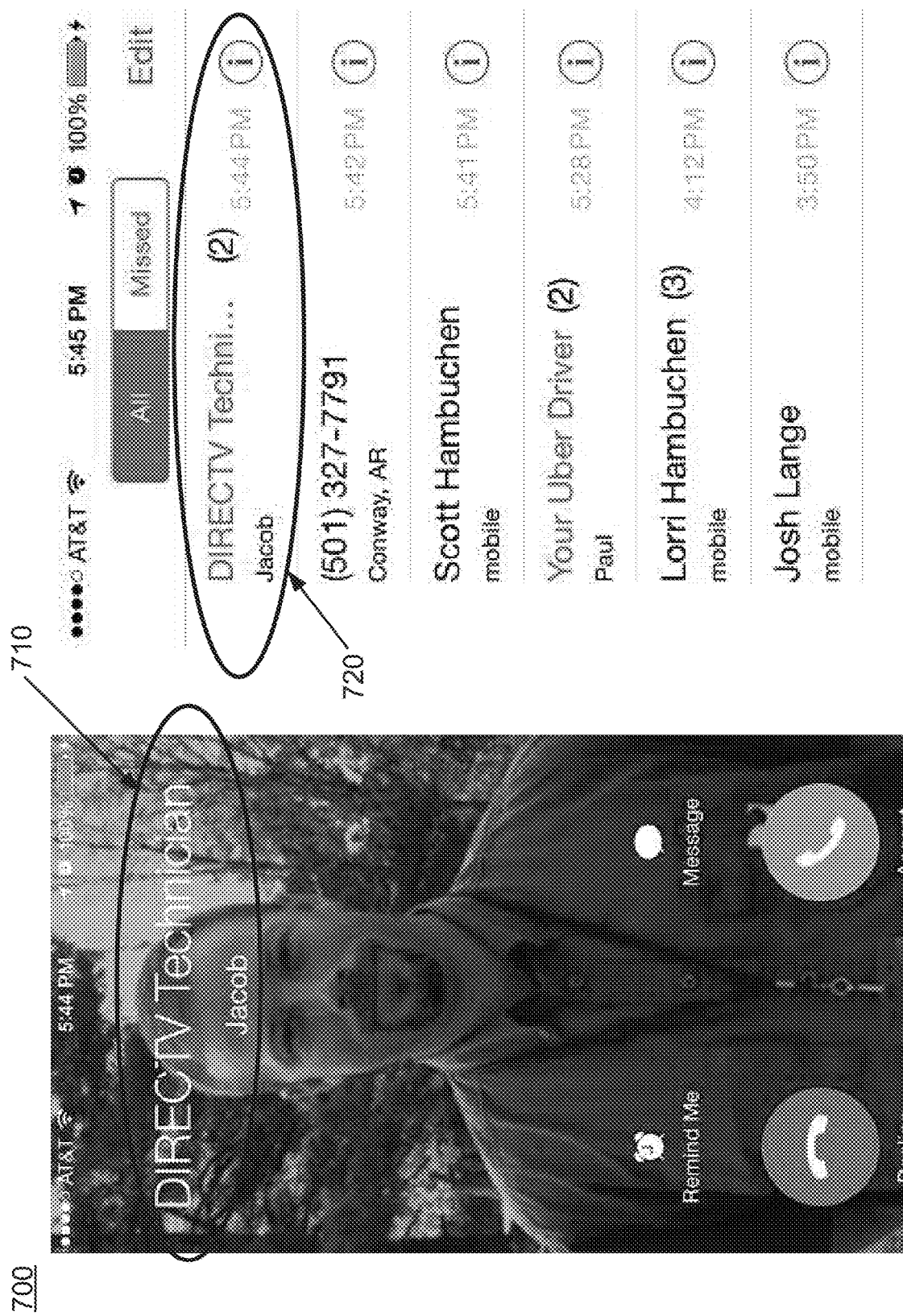
FIG. 7 illustrates still another example of a user interface of a smartphone call log with more detailed enhanced caller information according to example embodiments.

FIG. 7 illustrates still another example of a user interface of a smartphone call log with more detailed enhanced caller information according to example embodiments. Referring to FIG. 7, the user interface display examples 700 include a live call display 710 with a user name of a repair man and his customized display photo image, a name, and other information necessary to alert the call recipient of the purpose of the call. In this example, the repair man may be calling to confirm an appointment time to install a cable system and the recipient is more likely to answer the call and confirm the appointment since the information provided is more thorough and informative. The missed call segment 720 includes similar information for the cable service provider "DIRECTV", the repair man's name "JACOB" and other information available to alert the call recipient.

Figure 8:
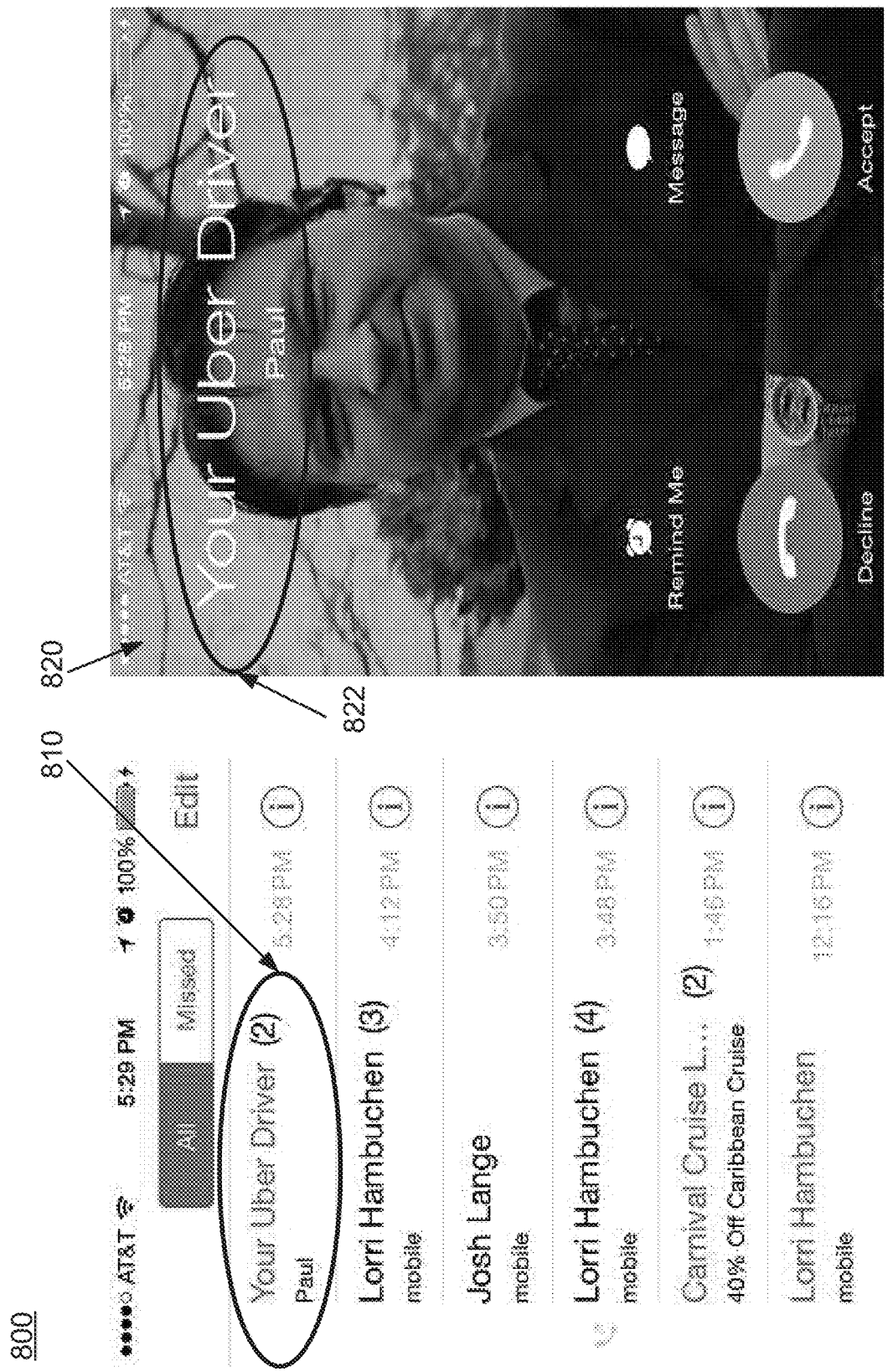
FIG. 8 illustrates still yet another example of a user interface of a smartphone call log with detailed enhanced caller information according to example embodiments.

FIG. 8 illustrates still yet another example of a user interface of a smartphone call log with detailed enhanced caller information according to example embodiments. Referring to FIG. 8, in a similar example, the user may have initiated an application service, such as "UBER" car transportation service. The information of the user interfaces 800 may include providing a user with a driver name identifier "Paul" 822 and a particular image 820, so the recipient can acknowledge the driver's request to communicate over a live call. In this example, the application being accessed for a driver may trigger a name, image and other information about the user and keep the information in a temporary queue until the call is placed and the user call recipient's phone device is actively ringing. At such a time, the active call can be paired with the enhanced information and the user may be able to observe the live call and the user information together for optimal call acknowledgment results.

Figure 9:
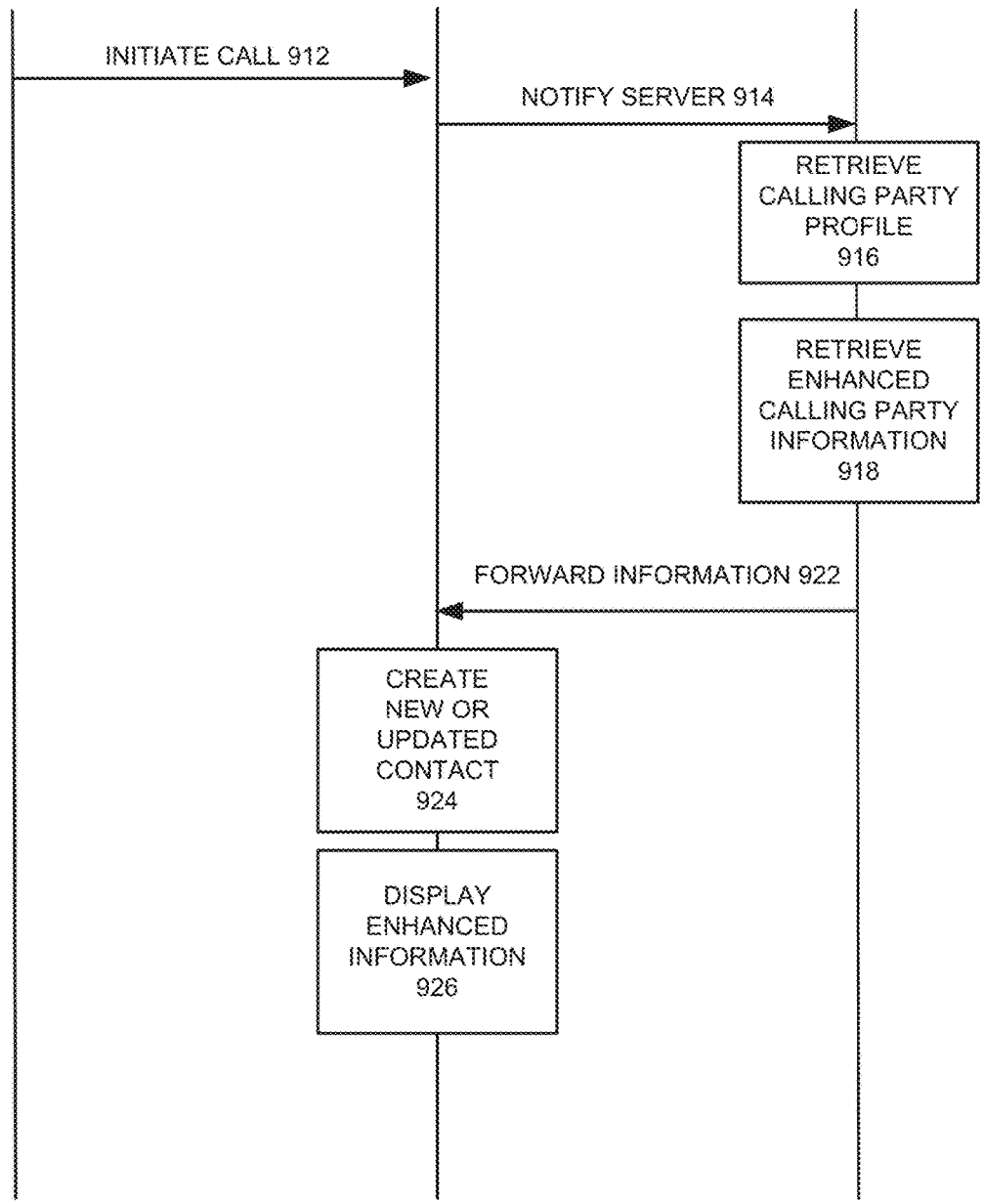
FIG. 9 illustrates an example system communication diagram of a procedure for establishing a call according example embodiments.

FIG. 9 illustrates an example system communication diagram of a procedure for establishing a call according to example embodiments. Referring to FIG. 9, the diagram illustration 900 includes three main devices and/or operating procedures including a calling party device 920, a called party device 930 and a third party information server 940. In operation, any calling party 920 calls/messages sent to the end user recipient 930 may provide the third party information initiating an update operation to the memory of the user device contact list before or during the incoming call being detected. Creating a contact is one example of storing new information. However, other ways to store new information may also be used.

Figure 10:
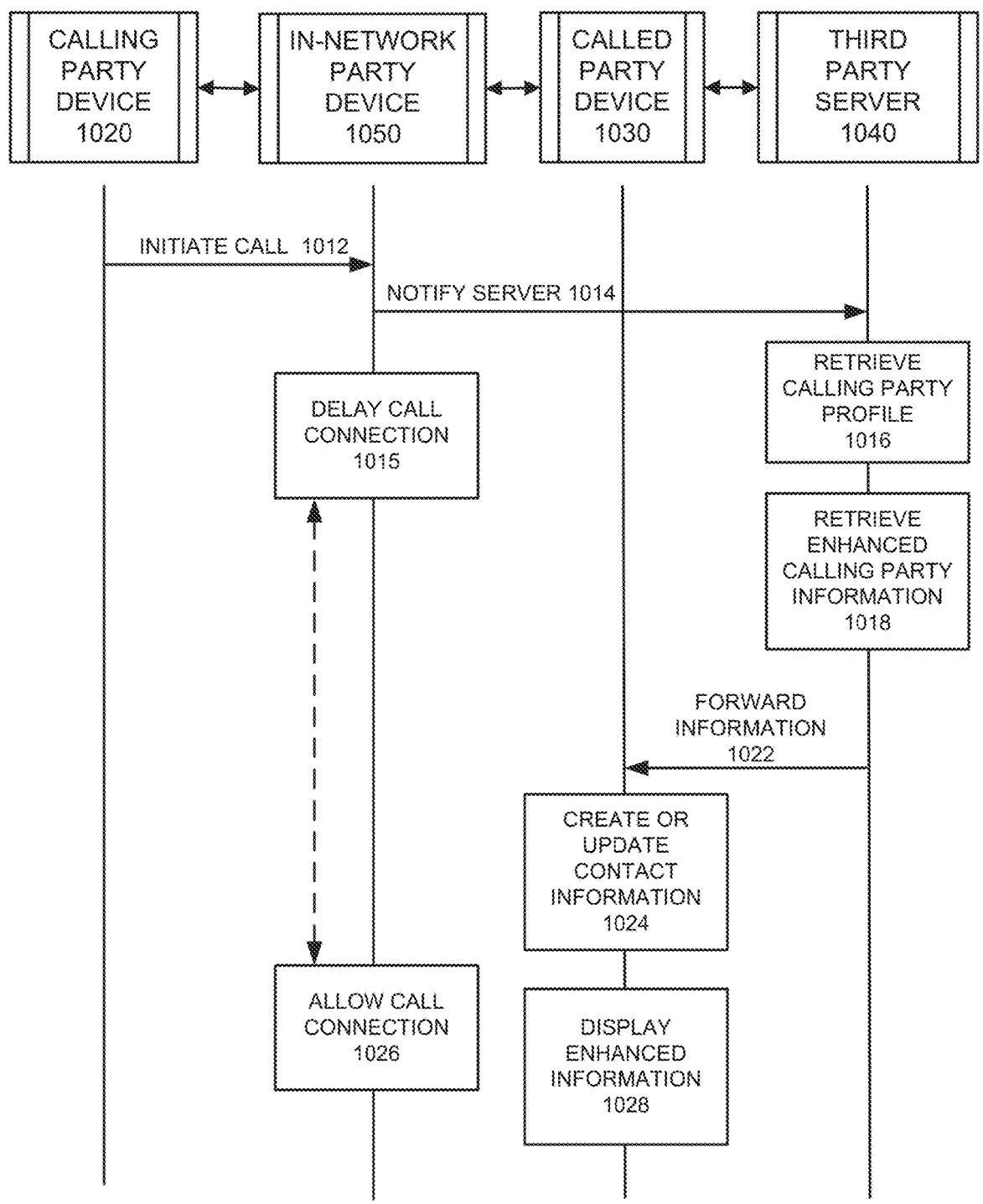
FIG. 10 illustrates another example system communication diagram of a procedure for establishing a call according to example embodiments.

In FIG. 9, the call may be initiated at operation 912 and the third party server 940 may be promptly notified 914 to retrieve the user profile 916 of the calling party device 920. The tags or attributes of the request message may indicate which media to include in the response media segment delivered to the recipient device. The media may be collectively transmitted 922 as a set of enhancement information 918 to the recipient device 930. The recipient device may create a new contact 924 and then display the enhancement information on the recipient device 930 along with an active call from the calling party device 920. Alternatively, the enhanced caller information may be loaded prior to or contemporaneously with a call, pre-loaded prior to or contemporaneously with a call and/or loaded according to user preferences so that the types of information are identified and loaded per a pre-established tag procedure that utilizes tags associated with a user preference record to identify the portions of the enhanced information that should or should not be included during an application access operation or a call FIG. 10 illustrates another example system communication diagram of a procedure for establishing a call according to example embodiments. Referring to FIG. 10, the diagram illustration 1000 includes four main devices and/or operating procedures including a calling party device 1020, a called party device 1030, an intermediate in-network device 1050 and a third party information server 1040. In operation, any calling party 1020 calls/messages sent to the end user recipient 1030 may provide the third party information initiating an update operation to the memory 41 the user recipient device 1030 contact list before or during the incoming call being detected. When the calling device 1020 calls/messages 1012 the recipient device 1030, the in-network device 1050 initiates a push of contact information by intercepting the call and notifying the third party server 1040 with or without delaying the call.

The in-network device 1050 may suspend the call 1015 until the user profile information is retrieved 1016 from the server 1040. The enhancement information is then retrieved 1018 from the profile and forwarded 1022 to the called party 1030 so the called party 1030 can update 1024 the contact information and pair the information with the incoming call so the enhancement information is displayed 1028 at the correct time. At some point contemporaneous with the information pairing and displaying of such enhancement information, the suspended call can be forwarded to the called recipient device 1030. Also, the enhancement information may be queued temporarily in the in-network device 1050 to ensure the active call does not initiate with the recipient device 1030 until the enhancement information has been received and loaded 1028 on the recipient device 1030. Once the enhancement information has been loaded, a confirmation may be transmitted to the in-network device 1050 to permit the calling procedure to resume and call the recipient device 1030.

Figure 11:
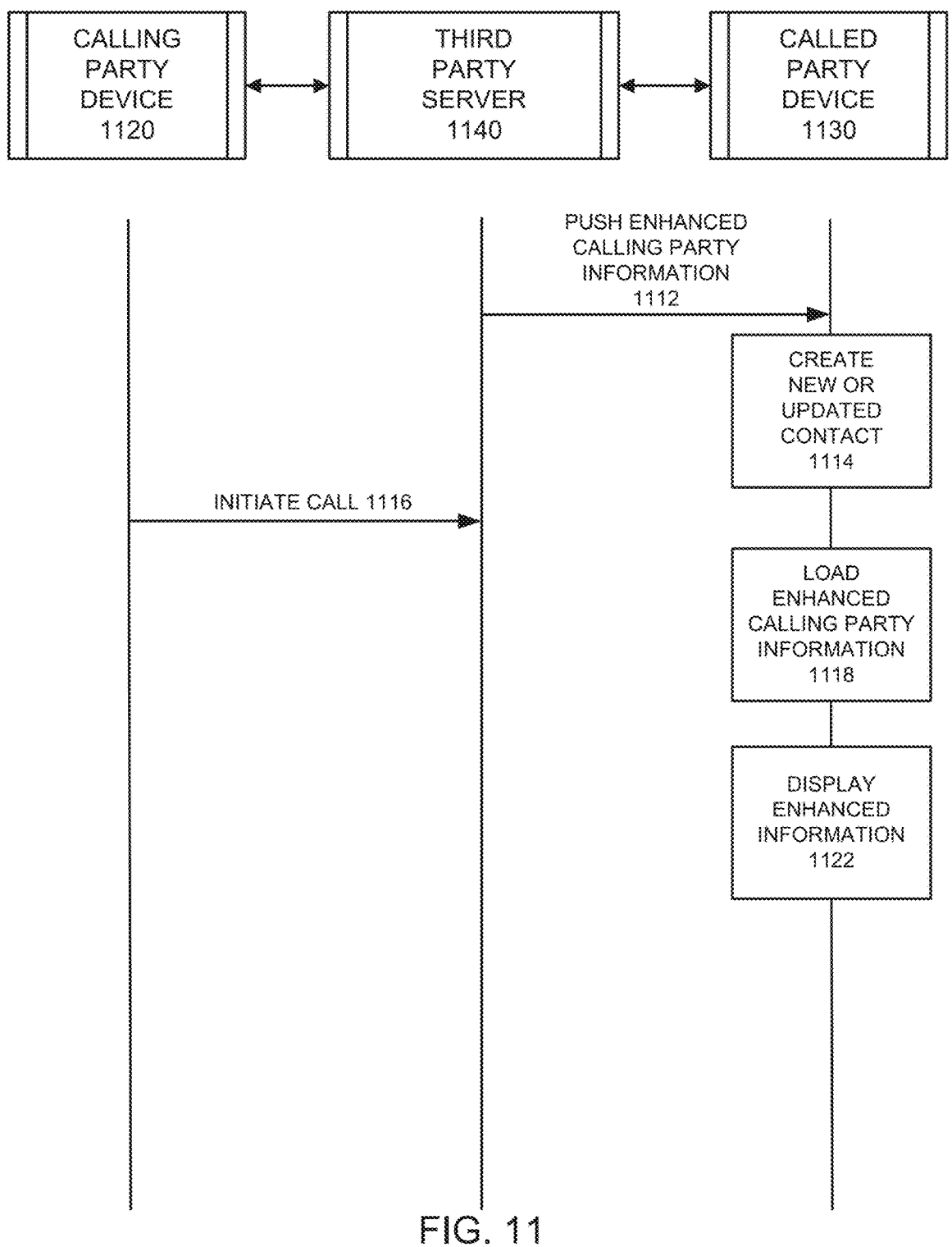
FIG. 11 illustrates yet another example system communication diagram of a procedure for establishing a call according to example embodiments.

FIG. 11 illustrates yet another example system communication diagram of a procedure for establishing a call according to example embodiments. Referring to FIG. 11, the diagram illustration 1100 includes three main devices and/or operating procedures including a calling party device 1120, a called party device 1130 and a third party information server 1140. In operation, any calling party 1120 calls/messages sent to the end user recipient 1130 may provide the third party information initiating an update operation to the memory of the user device contact list before or during the incoming call being detected. Additionally, instead of a specific insertion order, a process may be used by a specific customer, such as UBER to set their driver information in the system. It is a process and a set of tools, APIs, etc., enabling such companies as UBER or a bank call center to add the information, so that it can be subsequently displayed when the call is received. Also, marketing examples are only one type of example as opposed to other examples of communication and information sharing that may be utilized by the present application. The information shared may be associated with a user profile, such as an UBER tag. Whenever the UBER user calls the driver, regardless of the underlying phone number used by UBER, store the relationship between the user's picture/name/etc. and internal tags.

In this example, the third party server 1140 may initiate the information sharing operation instead of being prompted to do so by the calling device. For instance, a telemarketer service may be automatically or manually dialing the recipient device 1130 so the related media information/enhancement information may be pushed via a known push protocol as call information to the recipient device 1130 beforehand. For example, a service provider marketer or a field technician or any other calling party may call/message a customer end device prior to attempting a call. Before the call is placed, a 1st or 3rd party service pushes the related contact/media/enhancement information 1112 to the recipient device so an update may be performed 1114 and then the call can be placed 1116. The recipient device 1130 may load and update the information 1118 so the information may be displayed 1122. In one example, the calling device may have the option to transmit relevant information across the carrier network to the recipient device in addition to the common types of shared information. For example, a link, offer, audio/video file, invitation, email, etc., may be sent with the calling device initiating a call or once the call is connected.

Figure 12:
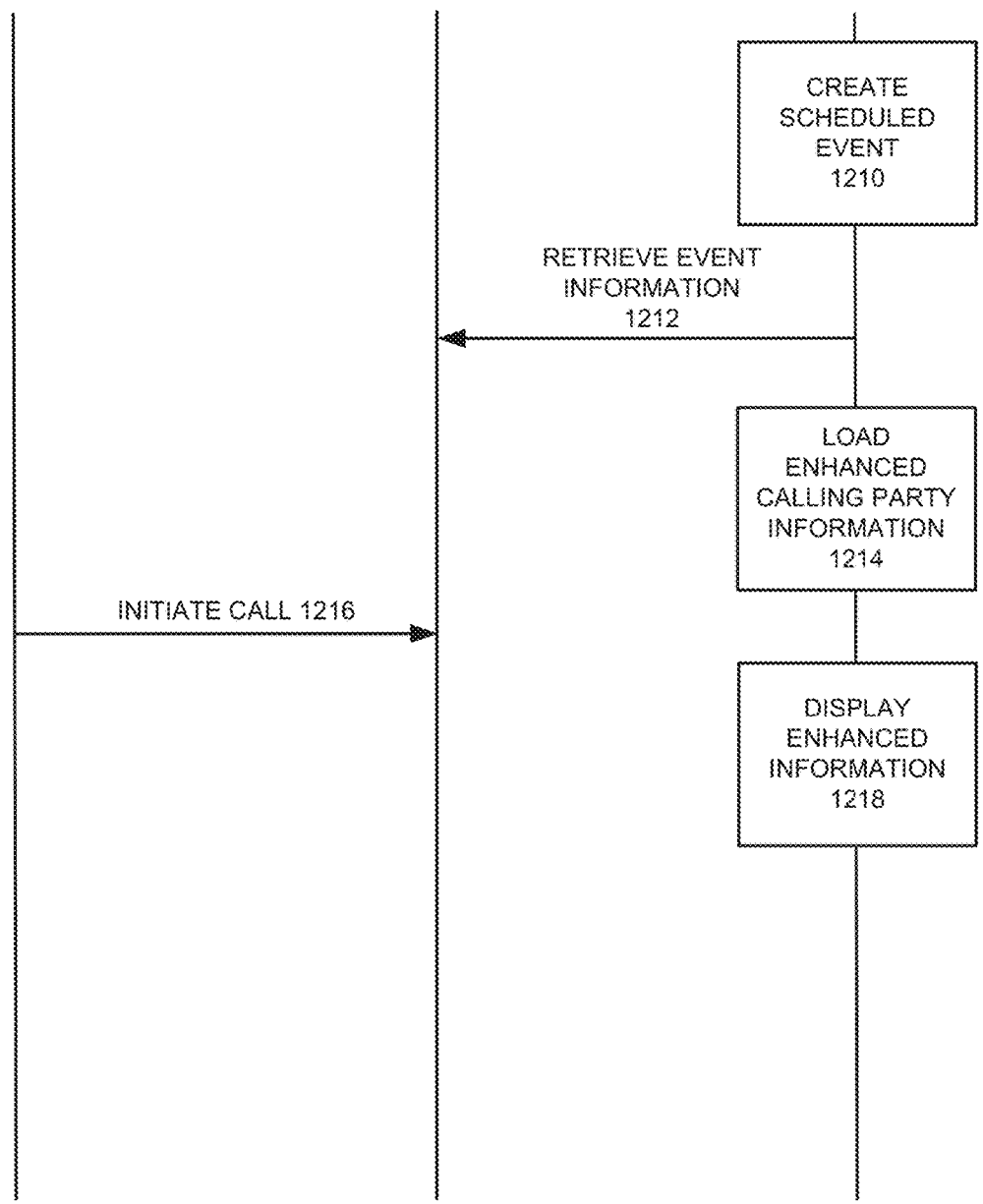
FIG. 12 illustrates still yet another example system communication diagram of a procedure for establishing a call according to example embodiments.

FIG. 12 illustrates still yet another example system communication diagram of a procedure for establishing a call according to example embodiments. Referring to FIG. 12, the diagram illustration 1200 includes three main devices and/or operating procedures including a calling party device 1220, a called party device 1230 and a third party information server 1240. In operation, any calling party 1220 places a call/message that is sent to the end user recipient 1230 and may provide the third party information for initiating an update operation to the memory of the user device contact list before or during the incoming call being detected. An application, such as UBER may be used to initiate a session which causes inserts/updates to a contact portion of the recipient device 1230. The update may be based on a scheduled time 1210 in the near future such as when a user desires to be picked-up by the driver. The user may perceive the enhanced call/message information received 1212 if the driver chooses to call 1216 them or if such a configuration is automatically setup ahead of the pickup time. Accordingly, the information may be loaded 1214 and displayed 1218.

Alternatively, the third party server may be an information server which makes a call to a backend server. For example, a network device caller identification name (CNAM) may be identified and normalized to change a name, such as 'JOHN SMITH' to 'John Smith' and to insert a static advertisement for their application profile into the picture field for the contact name. Before the call is placed, the caller cannot insert other content (e.g., dynamic contact information, advertisements, etc.), and the transaction cannot be initiated before the call arrives at the handset, the transaction is started after the CNAM has already delivered data to the device, and the device is already ringing.

The images and other content that are identified and in the request for information from the third party, a lookup operation is performed to identify if the t calling party has supplied enhanced caller ID information and can be identified from their profile. If so, and the party receiving the call has not opted to block this caller, a push message can be sent with all the relevant information down to the end user's device. After the push message is sent, the call is released to the end user. The call may be paused or temporarily held in suspension prior to receiving confirmation that the push message has been sent.

According to one example embodiment, a method of operation may include identifying that a call has been initiated via an origination device to a recipient device. The call may be identified by a third party server 110 or media (enhanced information) server. Responsive to identifying the call, a user profile may be retrieved that is associated with the origination device and/or the recipient device. Depending on which device is setup for enhanced information sharing and/or delivery, one or both of the devices may be configured to initiate, transmit and/or receive enhanced information. During the call audit procedure, one or more enhanced information tags may be identified in the user profile(s), enhanced information can then be retrieved that is linked to the enhanced information tags. For example, a user profile may have multiple tags which require retrieval of personal information (e.g., username, image, video, logo, catchphrase, etc.) and other information, such as advertisements, links to other sites, application downloads, updates, games, requests for permissions, information, news feeds, etc. The enhanced information is transmitted to the intended recipient device and the origination device as dictated by the profiles and tags. The server may mediate the information sharing and manage the call connection between the origination device and the intended recipient device. The enhanced information may be transmitted to the origination device via the server prior to the call being connected. Also, the enhanced information may be transmitted to the recipient device prior to the call being connected. When transmitting the enhanced information to the intended recipient device 112 and the origination device 114, the server may transmit a first set of enhanced information to the intended recipient device and a second set of enhanced information to the origination device. The information sets may be different as one party may be a marketing party and the other just an ordinary user. However, certain portions of the enhanced information may be the same. The user preferences may be setup to require certain information, such as a username, image, credentials, etc., and avoid other types of information, such as links, advertisements, pop-ups, etc. The first set of enhanced information may be transmitted to the intended recipient device prior to the second set of enhanced information being transmitted to the origination device or vice versa. The first set of enhanced information is likely different from the second set of enhanced information. The first set of enhanced information and the second set of enhanced information can include any of a username identifier, an image, a video file, a web link, a coupon, an advertisement, a designated short message service (SMS) message and other unspecified information. In one example, after a predetermined period of time has elapsed since connecting the call, a third set of enhanced information may be transmitted to the origination device and the intended recipient device. The third set of enhanced information may be triggered by an action or inaction by one or more of the caller parties. For example, if a called/calling party does not make a selection or purchase a product or service, then the third set of enhanced information may be a discount for the advertised product, such as a coupon or incentive to make the purchase. Since the initial communication, a certain amount of time may have elapsed and the lack of agreement to make the purchase may create an incentive offer that is delivered to the user device based on the time that has elapsed and the lack of purchase communication which occurred during the predetermined amount of time (e.g., 30 seconds, 1 minute, etc.).

According to another example embodiment, a method of operation may include initiating an application via a device instead of dialing a call. In this example, a communication session request may be transmitted to an intended recipient device 112 via the application itself 130 which is hosted by the origination device 114 and the third party server 110. The communication session request may be processed by the third party server 110 which retrieves enhanced information associated with the intended recipient, and which connects a live session between the device and the intended recipient device. The live session may include one or more of a call, a video conference, and a chat session. The application may be associated with a customer service center, such as a car ride service (e.g., UBER/LYFT), a banking service, a hotel service and an in-home service (i.e., cable provider, Internet service, etc.). The device and the intended recipient device may be identified as having an enhanced information profile, and the enhanced information profile may be retrieved accordingly. An enhanced information profile tag may be identified and used to identify a plurality of enhanced information articles including but not limited to a username identifier, an image, a video file, a web link, a coupon, an advertisement, a designated short message service (SMS) message. The enhanced information profile tag(s) may be applied to select the plurality of enhanced information articles, and transmit the plurality of enhanced information articles to the device. Once the information is received at the device(s), the live session data of the live session and the selected enhanced information articles are loaded on the device display. When intercepting the communication session request via the third party server, the server identifies the communication session request and pauses the communication session until the enhanced information is transmitted to at least one of the mobile deice and the intended recipient device. A confirmation may be sent back to the server that the enhanced information was sent and received by the intended devices and then the call can be loaded for the parties to connect.

In another example method of operation, a call may be initiated via an origination device to a recipient device. In this example, a call notification is forwarded to an enhanced information server responsive to initiating the call, and enhanced information is retrieved that is associated with at least one of the intended recipient device and the origination device. The server may transmit the enhanced information to at least one of the intended recipient device and the origination device, and the call between the origination device and the intended recipient device is connected. The enhanced information associated with the intended recipient device is received at the origination device prior to the call being connected. Transmitting the enhanced information to the intended recipient device and the origination device may also include transmitting a first set of enhanced information to the intended recipient device and a second set of enhanced information to the origination device. The two sets may be different from one another in context as on party may be a marketer and the other a customer. Other related information may be shared, such as an audio or video file, a social graph information or significant events from social networks, communication history with a user, calendar events that involve the caller and the callee, and presence and availability of the caller.

Figure 13:
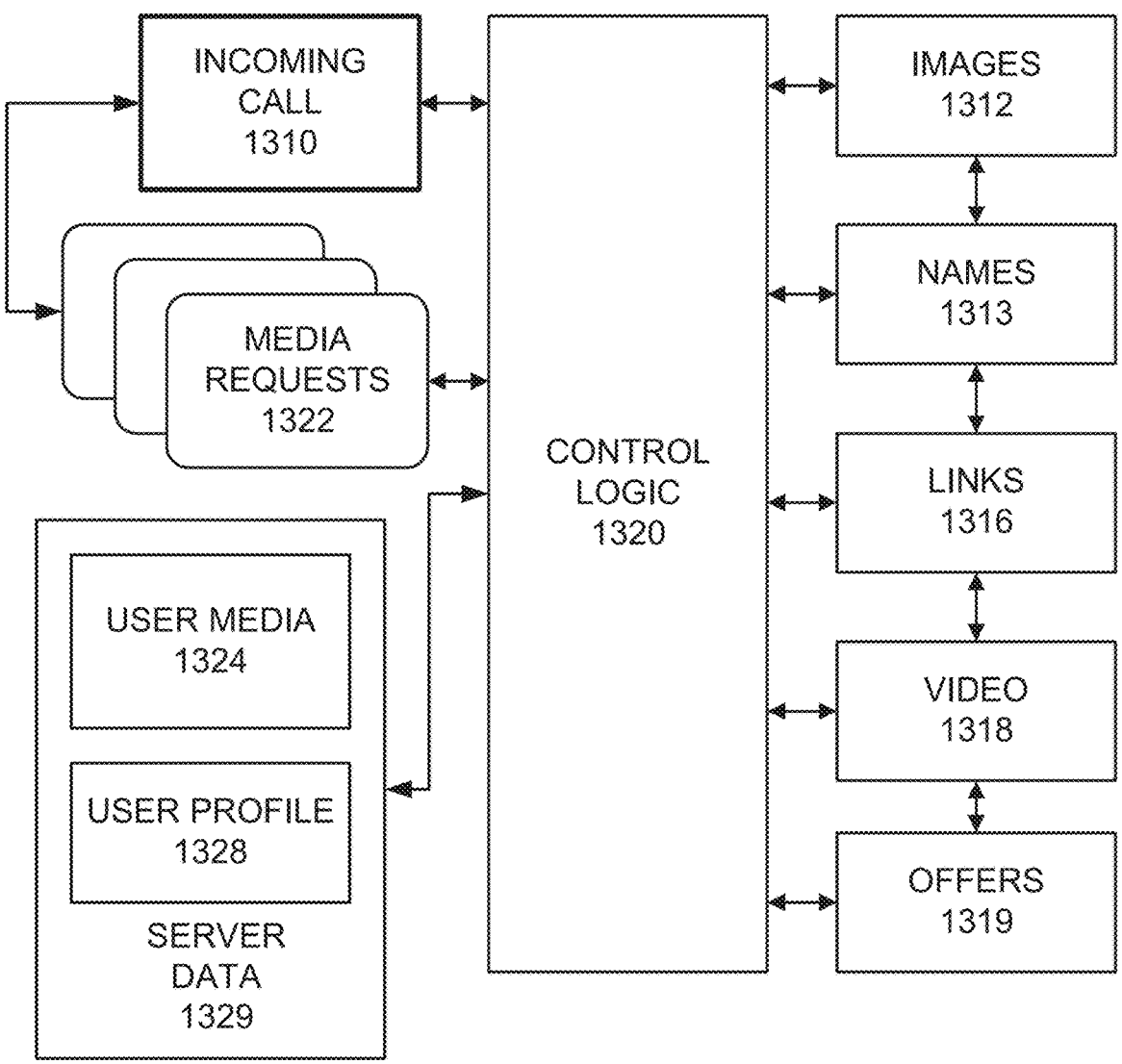
FIG. 13 illustrates a logic diagram that includes various inputs and outputs which are part of processing procedures according to example embodiments.

FIG. 13 illustrates a logic diagram that includes various inputs and outputs which are part of processing procedures according to example embodiments. Referring to FIG. 13, the logic diagram 1300 includes a processor logic 1320 that is triggered by an incoming call 1310 or other service request 1322. The user profile may be retrieved from server data 1329 and may include loading a profile 1328 and retrieving customized media information 1324. The processing unit 1320 may retrieve the information based on tags to include any or more of images 1312, names 1313, links 1316, video 1318 and/or other offer information 1319, such as marketing tags to be included in the enhanced information display.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 14 illustrates an example network element 1400, which may represent any of the above-described network components of the other figures.

Figure 14:
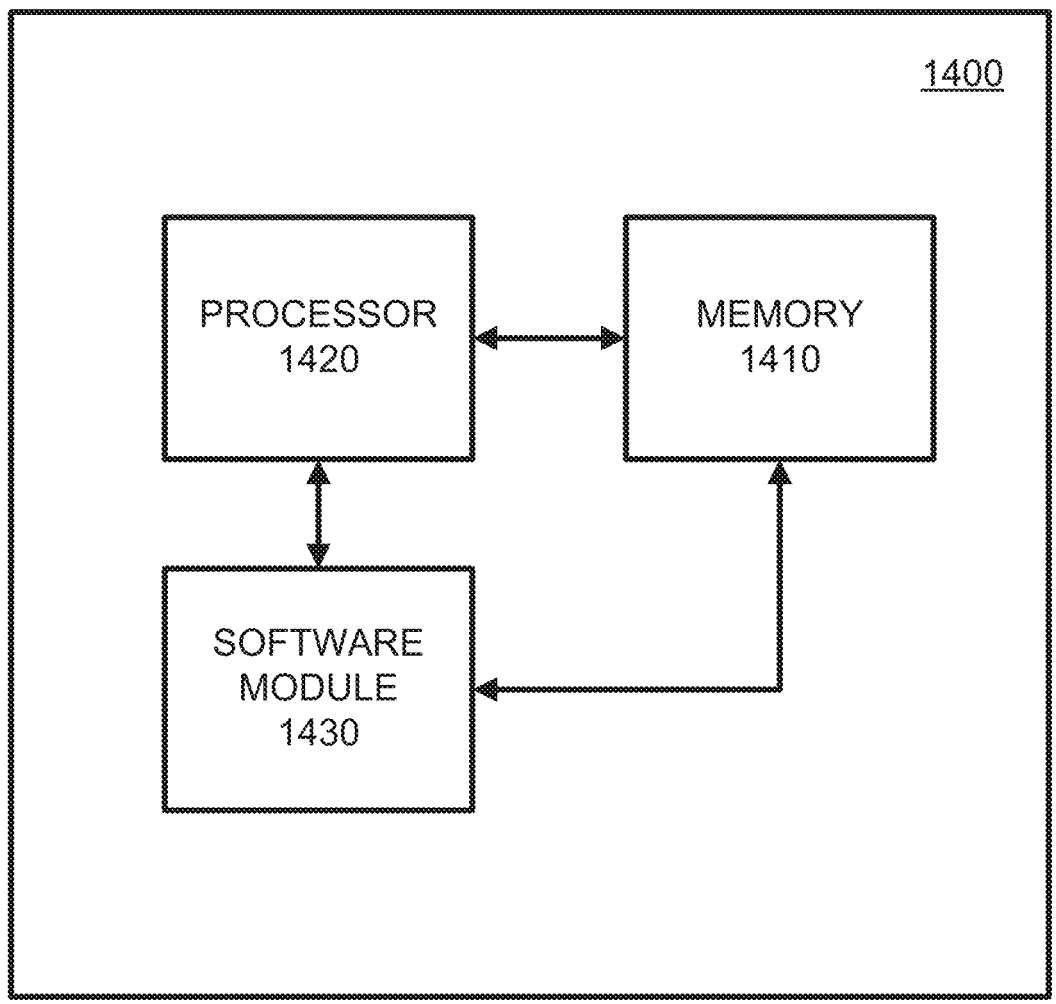
FIG. 14 illustrates an example network entity device configured to store instructions, software, and corresponding hardware for executing the same, according to example embodiments.

As illustrated in FIG. 14, a memory 1410 and a processor 1420 may be discrete components of the network entity 1400 that are used to execute an application or set of operations. The application may be coded in software in a computer language understood by the processor 1420, and stored in a computer readable medium, such as, the memory 1410. The computer readable medium may be a non-transitory computer readable medium that includes tangible hardware components in addition to software stored in memory. Furthermore, a software module 1430 may be another discrete entity that is part of the network entity 1400, and which contains software instructions that may be executed by the processor 1420. In addition to the above noted components of the network entity 1400, the network entity 1400 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   updating a contact list of a called device for a suspended call;
   loading a first enhanced calling party information on the called device for the suspended call; and
   responsive to a confirmation of the loading being received at an in-network device, forwarding the suspended call to the called device.

2. The method of claim 1, further comprising:
   providing, by the in-network device, a second enhanced information to a calling device from the called device.

3. The method of claim 2, further comprising:
   providing, by the in-network device, a third enhanced information to both the calling device and the called device based on an elapsing of a predetermined period of time starting when a call is connected.

4. The method of claim 2, further comprising:
   providing, by the in-network device, a third enhanced information to both the calling device and the called device based on an action or inaction performed on one or more of the calling device and the called device.

5. The method of claim 1, further comprising:
   notifying a server, by the in-network device, of the suspended call wherein the server retrieves the enhanced calling party information related to the called device.

6. The method of claim 1, further comprising:
   providing, by a server, the enhanced calling party information to the called device during the suspended call.

7. The method of claim 1, further comprising:
   storing the enhanced calling party information in a memory of the called device.

8. An apparatus comprising:
   a processor; and
   a memory to store one or more instructions that when executed by the processor cause the processor to:
   update a contact list of a called device for a suspended call;
   load a first enhanced calling party information on the called device for the suspended call; and
   responsive to a confirmation of the load being received at an in-network device, forward the suspended call to the called device.

9. The apparatus of claim 8, wherein the one or more instructions further cause the processor to:
   provide second enhanced information to a calling device from the called device.

10. The apparatus of claim 9, wherein the one or more instructions further cause the processor to:
    provide a third enhanced information to both the calling device and the called device based on an elapsing of a predetermined period of time starting when a call is connected.

11. The apparatus of claim 9, wherein the one or more instructions further cause the processor to:
    provide a third enhanced information to both the calling device and the called device based on an action or inaction by one or more of the calling device and the called device.

12. The apparatus of claim 8, wherein the one or more instructions further cause the processor to:
    notify a server of the suspended call wherein the server retrieves the enhanced calling party information related to the called device.

13. The apparatus of claim 8, wherein the one or more instructions further cause the processor to:
    provide the enhanced calling party information to the called device during the suspended call.

14. The apparatus of claim 8, wherein the one or more instructions further cause the processor to:
    store the enhanced calling party information in a memory of the called device.

15. A non-transitory computer readable storage medium configured to store one or more instructions that when executed by a processor cause the processor to perform:
    updating a contact list of a called device for a suspended call;
    loading a first enhanced calling party information on the called device for the suspended call; and
    responsive to a confirmation of the loading being received at an in-network device, forwarding the suspended call to the called device.

16. The non-transitory computer readable storage medium of claim 15, wherein the one or more instructions are further to cause the processor to perform:
    providing a second enhanced information to a calling device from the called device.

17. The non-transitory computer readable storage medium of claim 16, wherein the one or more instructions are further to cause the processor to perform:
    providing a third enhanced information to both the calling device and the called device based on an elapsing of a predetermined period of time starting when a call is connected.

18. The non-transitory computer readable storage medium of claim 16, wherein the one or more instructions are further to cause the processor to perform:
    providing a third enhanced information to both the calling device and the called device based on an action or inaction by one or more of the calling device and the called device.

19. The non-transitory computer readable storage medium of claim 15, wherein the one or more instructions are further to cause the processor to perform:
   notifying a server of the suspended call wherein the server retrieves the enhanced calling party information related to the called device.

20. The non-transitory computer readable storage medium of claim 15, wherein the one or more instructions are further to cause the processor to perform:
   providing the enhanced calling party information to the called device during the suspended call.

* * * * *